(12) United States Patent  (10) Patent No.: US 9,143,010 B2
Urano  (45) Date of Patent: Sep. 22, 2015

(54) WIRELESS POWER TRANSMISSION SYSTEM FOR SELECTIVELY POWERING ONE OR MORE OF A PLURALITY OF RECEIVERS

(75) Inventor: Takashi Urano, Tokyo (JP)

(73) Assignee: TDK CORPORATION, Tokyo (JP)

( * ) Notice: Subject to any disclaimer, the term of this patent is extended or adjusted under 35 U.S.C. 154(b) by 695 days.

(21) Appl. No.: 13/333,216

(22) Filed: Dec. 21, 2011

(65) Prior Publication Data

US 2012/0161541 A1  Jun. 28, 2012

Related U.S. Application Data

(60) Provisional application No. 61/427,620, filed on Dec. 28, 2010.

(51) Int. Cl.
*H02J 17/00* (2006.01)
*H02J 5/00* (2006.01)

(52) U.S. Cl.
CPC . *H02J 17/00* (2013.01); *H02J 5/005* (2013.01)

(58) Field of Classification Search
None
See application file for complete search history.

(56) References Cited

U.S. PATENT DOCUMENTS

| 6,459,218 B2 * | 10/2002 | Boys et al. ............... 315/324 |
| 7,741,734 B2 | 6/2010 | Joannopoulos et al. |
| 8,547,057 B2 * | 10/2013 | Dunworth et al. ........... 320/108 |
| 2007/0222542 A1 | 9/2007 | Joannopoulos et al. |
| 2008/0211320 A1 | 9/2008 | Cook et al. |
| 2008/0278264 A1 | 11/2008 | Karalis et al. |
| 2009/0015075 A1 | 1/2009 | Cook et al. |
| 2009/0045772 A1 | 2/2009 | Cook et al. |
| 2009/0051224 A1 | 2/2009 | Cook et al. |
| 2009/0058189 A1 | 3/2009 | Cook et al. |
| 2009/0072627 A1 | 3/2009 | Cook et al. |
| 2009/0072628 A1 | 3/2009 | Cook et al. |
| 2009/0072629 A1 | 3/2009 | Cook et al. |
| 2009/0079268 A1 | 3/2009 | Cook et al. |
| 2009/0102292 A1 | 4/2009 | Cook et al. |
| 2009/0134712 A1 | 5/2009 | Cook et al. |
| 2009/0167449 A1 | 7/2009 | Cook et al. |
| 2009/0179502 A1 | 7/2009 | Cook et al. |
| 2009/0195332 A1 | 8/2009 | Joannopoulos et al. |
| 2009/0195333 A1 | 8/2009 | Joannopoulos et al. |
| 2009/0212636 A1 | 8/2009 | Cook et al. |

(Continued)

FOREIGN PATENT DOCUMENTS

JP  U-06-047980  6/1994
JP  A-2006-230032  8/2006

(Continued)

*Primary Examiner* — Rexford Barnie
*Assistant Examiner* — David Shiao
(74) *Attorney, Agent, or Firm* — Oliff PLC

(57) ABSTRACT

A wireless power transmission system according to an embodiment of the present invention is a wireless power transmission system performing non-contact power transmission from a wireless power feeder selectively to a plurality of wireless power receivers, and each of the plurality of wireless power receivers comprises a power receive resonance circuit including a power receive coil and a power receive capacitor, and the wireless power feeder comprises a power feed coil and a control circuit supplying AC power to the power feed coil. The control circuit in the wireless power feeder performs power supply selectively to the plurality of wireless power receivers by changing frequency of the AC power on the basis of a magnetic field resonance effect between the power feed coil and the power receive coil.

6 Claims, 15 Drawing Sheets

(56) References Cited

U.S. PATENT DOCUMENTS

| | | |
|---|---|---|
| 2009/0213028 A1 | 8/2009 | Cook et al. |
| 2009/0224608 A1 | 9/2009 | Cook et al. |
| 2009/0224609 A1 | 9/2009 | Cook et al. |
| 2009/0224856 A1 | 9/2009 | Karalis et al. |
| 2009/0243397 A1 | 10/2009 | Cook et al. |
| 2009/0267709 A1 | 10/2009 | Joannopoulos et al. |
| 2009/0267710 A1 | 10/2009 | Joannopoulos et al. |
| 2009/0273242 A1 | 11/2009 | Cook |
| 2009/0284083 A1 | 11/2009 | Karalis et al. |
| 2009/0284164 A1 * | 11/2009 | Ray et al. ............... 315/218 |
| 2010/0038970 A1 | 2/2010 | Cook et al. |
| 2010/0052431 A1 * | 3/2010 | Mita ............... 307/104 |
| 2010/0096934 A1 | 4/2010 | Joannopoulos et al. |
| 2010/0102639 A1 | 4/2010 | Joannopoulos et al. |
| 2010/0102640 A1 | 4/2010 | Joannopoulos et al. |
| 2010/0102641 A1 | 4/2010 | Joannopoulos et al. |
| 2010/0117455 A1 | 5/2010 | Joannopoulos et al. |
| 2010/0117456 A1 | 5/2010 | Karalis et al. |
| 2010/0123353 A1 | 5/2010 | Joannopoulos et al. |
| 2010/0123354 A1 | 5/2010 | Joannopoulos et al. |
| 2010/0123355 A1 | 5/2010 | Joannopoulos et al. |
| 2010/0127573 A1 | 5/2010 | Joannopoulos et al. |
| 2010/0127574 A1 | 5/2010 | Joannopoulos et al. |
| 2010/0127575 A1 | 5/2010 | Joannopoulos et al. |
| 2010/0133918 A1 | 6/2010 | Joannopoulos et al. |
| 2010/0133919 A1 | 6/2010 | Joannopoulos et al. |
| 2010/0133920 A1 | 6/2010 | Joannopoulos et al. |
| 2010/0141042 A1 | 6/2010 | Kesler et al. |
| 2010/0148589 A1 | 6/2010 | Hamam et al. |
| 2011/0114401 A1 * | 5/2011 | Kanno ............... 180/65.21 |
| 2011/0304216 A1 * | 12/2011 | Baarman ............... 307/104 |
| 2011/0316348 A1 * | 12/2011 | Kai et al. ............... 307/104 |
| 2012/0001485 A1 * | 1/2012 | Uchida ............... 307/11 |

FOREIGN PATENT DOCUMENTS

| | | |
|---|---|---|
| JP | 2007034749 A * | 2/2007 |
| JP | A-2010-63245 | 3/2010 |
| WO | WO 2006/022365 A1 | 3/2006 |
| WO | WO 2010101078 A1 * | 9/2010 |
| WO | WO 2010116441 A1 * | 10/2010 |

* cited by examiner

WIRELESS POWER TRANSMISSION SYSTEM FOR SELECTIVELY POWERING ONE OR MORE OF A PLURALITY OF RECEIVERS

CROSS REFERENCE TO RELATED APPLICATION

This application claims priority to U.S. Provisional Application No. 61/427,620 filed on Dec. 28, 2010 by the same Applicant, which is hereby incorporated by reference in its entirety.

BACKGROUND OF THE INVENTION

1. Field of the Invention

The present invention relates to a wireless power transmission system for performing power transmission by a non-contact method.

2. Related Background Art

Japanese Patent Application Laid-Open Publication No. 2010-63245 discloses a non-contact power feed apparatus (wireless power transmission system) comprising: a power feeding source (wireless power feeder) including a power feeding source resonance element having a variable mechanism changing a resonance frequency discretely or continuously, a power feeding source excitation element (excitation coil) coupled to the power feeding source resonance element by electromagnetic induction, and an AC power source applying AC current having the same frequency as the resonance frequency to the excitation element; and plural power feeding destinations (Wireless power receivers) each including a power feeding destination resonance element having a specific resonance frequency, a power feeding destination excitation element (load coil) coupled to the power feeding destination resonance element by electromagnetic induction, and an output circuit outputting current induced in the power feeding destination excitation element, wherein the non-contact power feed apparatus changes the resonance frequency of the power feeding source and performs power feeding selectively to the power feeding destinations having the respective specific resonance frequencies different from one another. Thereby, it is concluded that selective power feeding to a specific power feeding destination can be performed.

SUMMARY OF THE INVENTION

The present invention also aims at providing a wireless power transmission system which can perform power transmission from a wireless power feeder selectively to plural wireless power receivers.

A wireless power transmission system of the present invention is a wireless power transmission system performing non-contact power transmission from a wireless power feeder selectively to plural wireless power receivers, and each of the plural wireless power receivers comprises a power receive resonance circuit including a power receive coil and a power receive capacitor, and the wireless power feeder comprises a power feed coil and a control circuit supplying AC power to the power feed coil. The control circuit in the wireless power feeder performs power feeding selectively to the plural wireless power receivers by changing frequency of the AC power on the basis of a magnetic field resonance effect between the power feed coil and the power receive coil.

According to this wireless power transmission system, it is possible to perform non-contact power transmission from a wireless power feeder selectively to plural wireless power receivers.

The wireless power transmission system of the present invention may have a form in which the power receive resonance circuits in the plural wireless power receivers have resonance frequencies different from one another, respectively, and a winding region of the power receive coil in each of the plural wireless power receivers is smaller than ¼ of a winding region of the power feed coil.

Further, the wireless power transmission system of the present invention may have a form in which the power receive resonance circuits in the plural wireless power receivers have resonance frequencies different from one another, respectively, and a winding diameter of the power receive coil in each of the plural wireless power receivers is smaller than ½ of a winding diameter of the power feed coil.

When the winding region of the power receive coil in the wireless power receiver is equal to or larger than ¼ of the winding region of the power feed coil in the wireless power feeder, or when the winding diameter of the power receive coil in the wireless power receiver is equal to or larger than ½ of the winding diameter of the power feed coil in the wireless power feeder, the power receive coil is affected magnetically by the power feed coil, a mutual inductance is changed depending on a variation of a relative distance between the power feed coil and the power receive coil, and the resonance frequency is changed.

However, according to this wireless power transmission system, since the winding region of the power receive coil in the wireless power receiver is smaller than ¼ of the winding region of the power feed coil in the wireless power feeder, or since the winding diameter of the power receive coil in the wireless power receiver is smaller than ½ of the winding diameter of the power feed coil in the wireless power feeder, the power receive coil is not easily affected magnetically by the power feed coil and it is possible to suppress the change of the mutual inductance depending on the variation of the relative distance between the power feed coil and the power receive coil. As a result, it is possible to suppress the change of the resonance frequency and it is possible to suppress complication of drive frequency control for the power feed coil.

Further, the wireless power transmission system of the present invention may have a form in which the power receive resonance circuits in the plural wireless power receivers have approximately the same resonance frequency, the power receive coils in the plural wireless power receivers are disposed in distances different from one another from the power feed coil, respectively, and a winding region of the power receive coil in each of the plural wireless power receivers is equal to or larger than ¼ of a winding region of the power feed coil.

Further, the wireless power transmission system of the present invention may have a form in which the power receive resonance circuits in the plural wireless power receivers have approximately the same resonance frequency, the power receive coils in the plural wireless power receivers are disposed in distances different from one another from the power feed coil, respectively, and a winding diameter of the power receive coil in each of the plural wireless power receivers is equal to or larger than ½ of a winding diameter of the power feed coil.

According to this wireless power transmission system, since the winding region of the power receive coil in the wireless power receiver is equal to or larger than ¼ of the winding region of the power feed coil in the wireless power feeder, or since the winding diameter of the power receive coil in the wireless power receiver is equal to or larger than ½ of the winding diameter of the power feed coil in the wireless power feeder, the power receive coil is easily affected magnetically by the power feed coil. As a result, even if the resonance frequencies of the power receive resonance circuits in the plural wireless power receivers are approximately the same, respectively, it is possible to perform non-contact power transmission from the wireless power feeder selectively to the plural wireless power receivers by making use of change in the mutual inductance and change in the resonance frequency depending on the relative distance between the power feed coil and the power receive coil when the power receive coils in the plural wireless power receivers are disposed in distances different from one another from the power feed coil, respectively.

Further, according to this wireless power transmission system, the same power receive coil and the same power receive capacitor can be used in the plural wireless power receivers and thus the same product can be used for the plural wireless power receivers.

Further, the wireless power transmission system of the present invention may have a form in which the power receive resonance circuits in some wireless power receivers among the above plural wireless power receivers have resonance frequencies different from one another, respectively, a winding region of the power receive coil in each of the some wireless power receivers is smaller than ¼ of a winding region of the power feed coil, the respective power receive resonance circuits in the other wireless power receivers among the above plural wireless power receivers have approximately the same resonance frequency, the power receive coils in the other wireless power receivers are disposed in distances different from one another from the power feed coil, respectively, and a winding region of the power receive coil in each of the other wireless power receivers is equal to or larger than ¼ of a winding region of the power feed coil.

Further, the wireless power transmission system of the present invention may have a form in which the power receive resonance circuits in some wireless power receivers among the above plural wireless power receivers have resonance frequencies different from one another, respectively, a winding diameter of the power receive coil in each of the some wireless power receivers is smaller than ½ of a winding diameter of the power feed coil, the respective power receive resonance circuits in the other wireless power receivers among the above plural wireless power receivers have approximately the same resonance frequency, the power receive coils in the other wireless power receivers are disposed in distances different from one another from the power feed coil, respectively, and a winding diameter of the power receive coil in each of the other wireless power receivers is equal to or larger than ½ of a winding diameter of the power feed coil.

Further, the wireless power transmission system of the present invention may have a form in which the power feed coil in the above wireless power feeder substantially does not constitute a resonance circuit. Thereby, the configuration of the wireless power feeder becomes simple.

Further, the wireless power transmission system of the present invention may have a form in which the control circuit in the above wireless power feeder performs power supply so that AC power having a frequency corresponding to each of the respective power receive resonance circuits in the plural wireless power receivers is supplied to the power receive coil in a time division manner.

According to the present invention, it is possible to perform power transmission from a wireless power feeder selectively to plural wireless power receivers.

DESCRIPTION OF THE PREFERRED EMBODIMENTS

Figure 1:
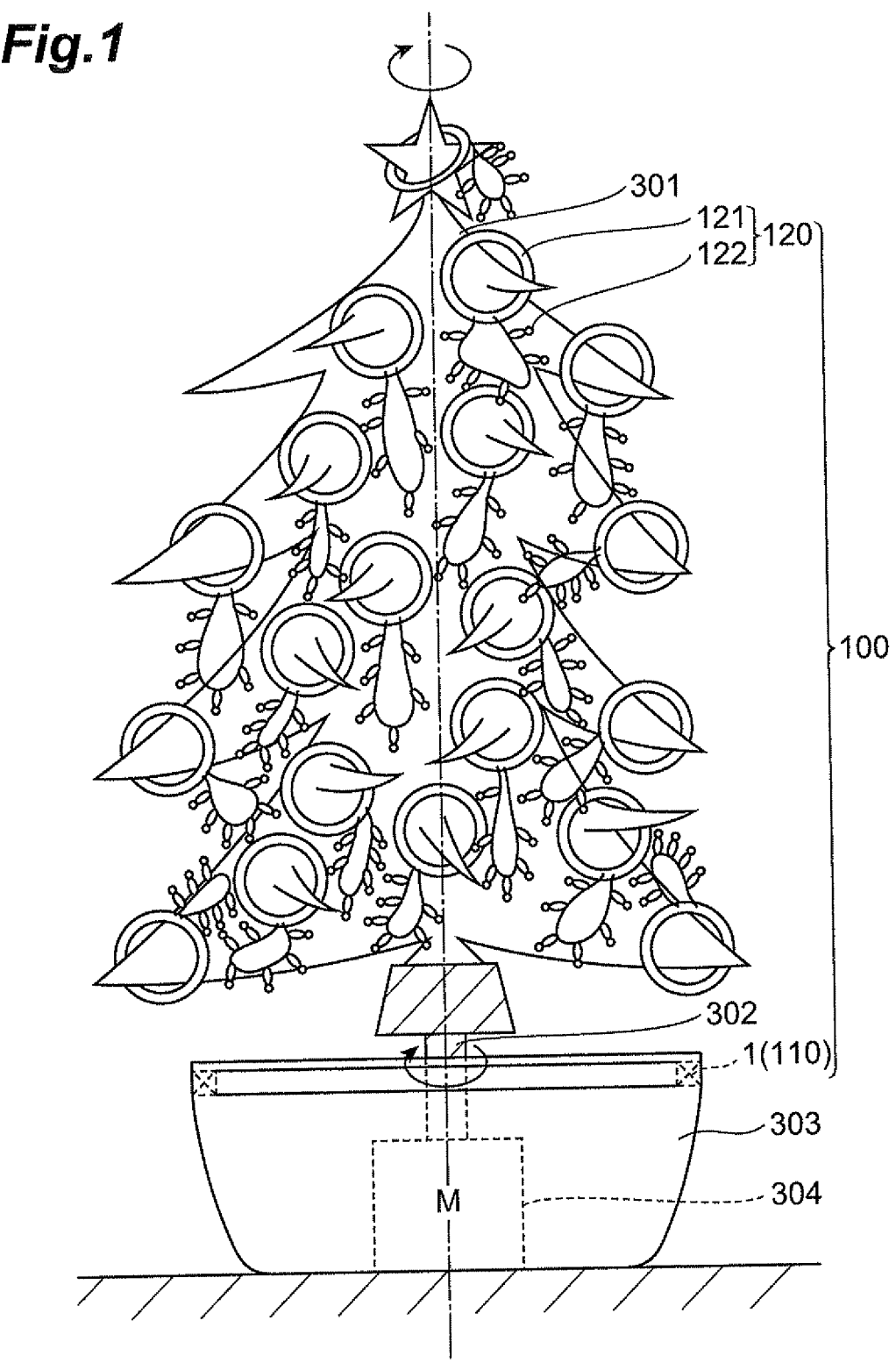
FIG. 1 is a diagram showing a schematic configuration of a wireless power transmission system according to a first embodiment of the present invention.

Hereinafter, preferable embodiments of the present invention will be explained in detail with reference to the drawings. Note that the same or an equivalent part is denoted by the same reference numeral in each of the drawings.

First Embodiment

Figure 2:
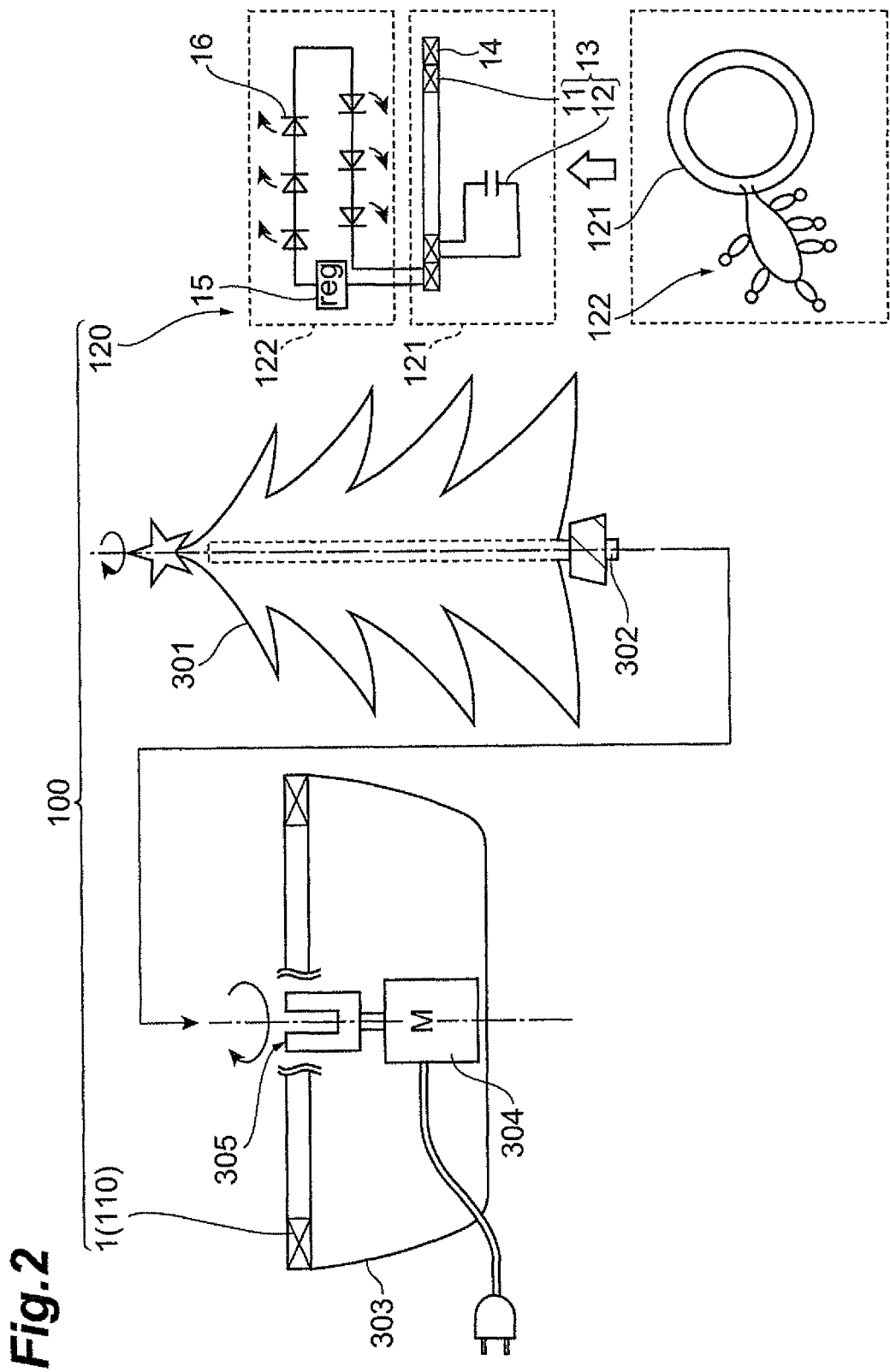
FIG. 2 is a diagram showing a breakdown structure of the wireless power transmission system shown in FIG. 1.

FIG. 1 is a diagram showing a schematic configuration of a wireless power transmission system according to a first embodiment of the present invention. FIG. 2 is a diagram showing a breakdown structure of the wireless power transmission system shown in FIG. 1.

As shown in FIG. 1 and FIG. 2, a wireless power transmission system 100 is mounted in a Christmas tree unit, for example. In the Christmas tree unit, a Christmas tree 301 having a rotation axis 302 is driven to be rotatable by a motor 304 mounted in a plant pod 303. More specifically, the rotation axis 302 of the Christmas tree 301 is fitted with a rotation axis 305 of the motor 304. A wireless power feeder 110 in the wireless power transmission system 100 is mounted in the plant pod 303 and plural wireless power receivers 120 in the wireless power transmission system 100 are mounted in the Christmas tree 301.

The wireless power feeder 110 includes a power feed coil 1. On the other side, the wireless power receiver 120 includes a power receive unit 121 and a lamp unit 122. The power receive unit 121 includes a power receive resonance circuit 13 having a power receive coil 11 and a power receive capacitor 12 and a power receive load coil 14 which is wound around an outer perimeter of the power receive coil 11 and coupled electromagnetically to the power receive coil 11. The lamp unit 122 includes a regulator (AC/DC) 15 stabilizing power induced in the power receive load coil 14 and six LEDs 16 connected serially to the regulator 15.

For example, in the Christmas tree unit, each of the lamp units 122 includes an LED 16 having any of three colors of red, white and blue, and the LEDs of three colors, red, white, and blue, are lit alternately and stage illumination. For this purpose, the wireless power transmission system 100 performs non-contact power transmission from the wireless power feeder 110 selectively to the plural wireless power receivers 120.

Figure 3:
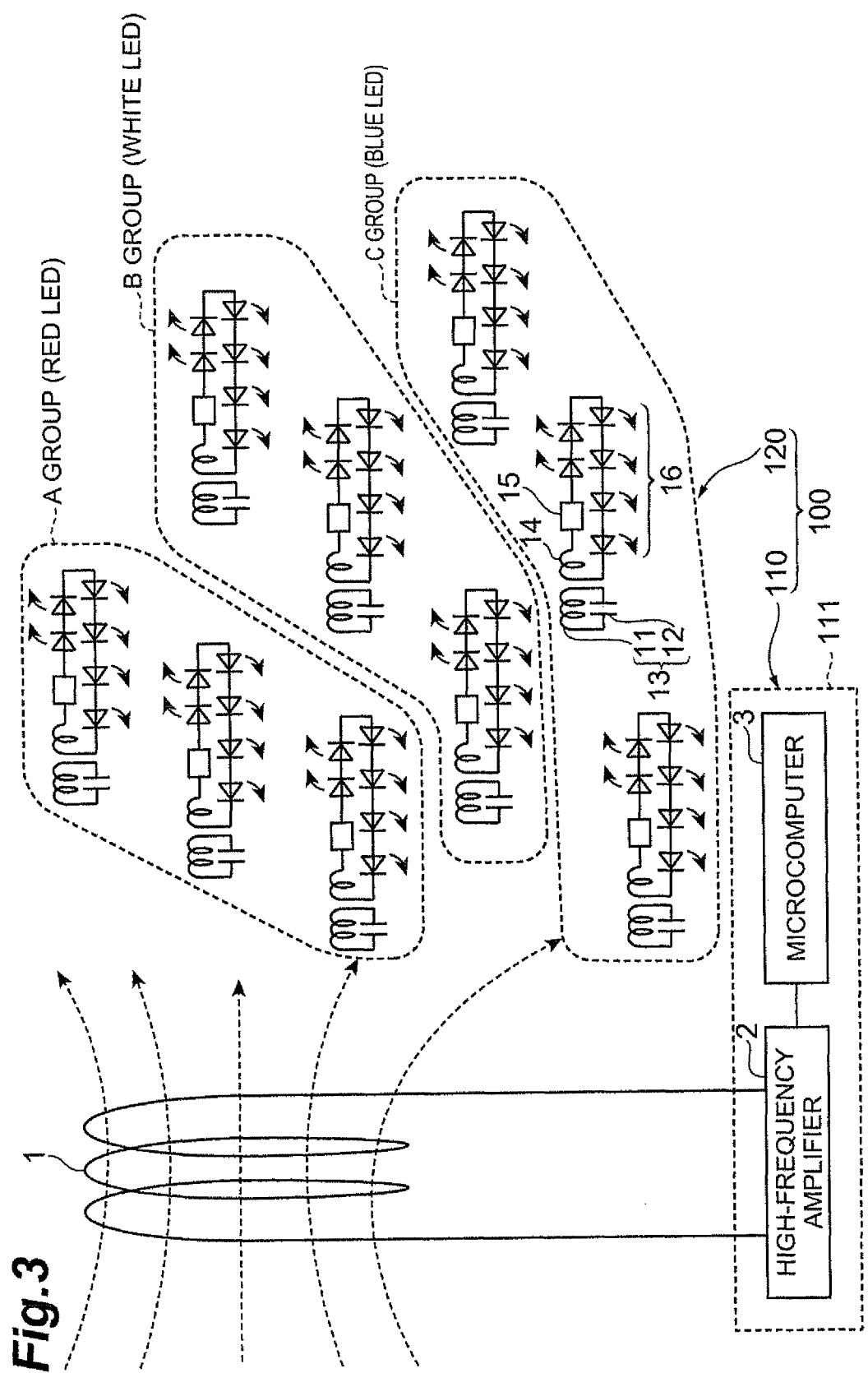
FIG. 3 is a diagram showing an electrical configuration of a wireless power transmission system according to a first embodiment of the present invention.

FIG. 3 is a diagram showing an electrical configuration of the wireless power transmission system according to the first embodiment of the present invention. The wireless power transmission system 100 shown in FIG. 3 includes the wireless power feeder 110 and the nine wireless power receivers 120.

The wireless power feeder 110 includes the power feed coil 1, and a control circuit 111. On the other side, the wireless power receiver 120 includes the power receive resonance circuit 13 having the power receive coil 11 and the power receive capacitor 12.

In the wireless power feeder 110, when the control circuit 111 supplies AC current (e.g., rectangular wave or sinusoidal wave current) to the power feed coil 1, power supply from the power feed coil 1 to the power receive coil 11 is performed on the basis of a magnetic field resonance effect between the power feed coil 1 and the power receive coil 11. Here, the "magnetic field resonance effect between the power feed coil 1 and the power receive coil 11" means a resonance effect of the power receive resonance circuit 13 based on AC magnetic field generated by the power feed coil 1. When AC current is supplied to the power feed coil 1, AC magnetic field is generated by the power feed coil 1. Thereby, the power feed coil 1 and the power receive coil 11 are magnetically coupled and the power receive resonance circuit 13 resonates. At this time, the control circuit 111 causes the frequency of the AC current to coincide with the frequency of resonance current in the power receive resonance circuit 13. Then, even if the power feed coil 1 itself does not resonate, the power factor of transmission power can be made one and a highly efficient power transmission can be performed.

In this manner, in the wireless power feeder 110, the power feed coil 1 substantially does not constitute a resonance circuit. Here, "substantially does not constitute a resonance circuit" means that the power feed coil 1 does not form a resonance circuit having the same resonance frequency as the resonance frequency of the power receive resonance circuit 13, but does not mean to exclude even that the power feed coil 1 resonates incidentally with any circuit element. For example, "substantially does not constitute a resonance circuit" means that a capacitor is not provided in series or in parallel for the power feed coil 1 to form a resonance circuit having the same resonance frequency as the resonance frequency of the power receive resonance circuit 13.

In the wireless power feeder 110, as magnetic field coupling becomes stronger between the power feed coil 1 and the power receive coil 11, the resonance frequency of the power receive resonance circuit 13 is affected more. That is, the resonance frequency of the power receive resonance circuit 13, when the power feed coil 1 and the power receive coil 11 are made so close to each other as to be magnetically coupled, shifts from the resonance frequency of the power receive resonance circuit 13 alone when the power feed coil 1 and the power receive coil 11 are so apart from each other that the magnetic field coupling between both of the coils can be neglected. By supplying AC current having a frequency near the resonance frequency of the power receive resonance circuit 13 to the power feed coil 1, it becomes possible to realize magnetic field resonance type wireless power feeding.

Next, the wireless power receiver 120 will be explained in detail. The wireless power receiver 120 further includes the power receive load coil 14, the regulator (AC/DC) 15, and the six LEDs 16 connected serially.

The coupling between the power receive coil 11 and the power receive load coil 14 is a coupling utilizing an electromagnetic induction and the degree of the coupling is so high as to have a coupling coefficient of 0.9 or higher, for example. By using this load coil 14, it is possible to suppress Q-value reduction of the power receive resonance circuit 13 due to a load. AC power (AC voltage) induced in the load coil 14 is stabilized by the regulator (AC/DC) 15 and supplied to the LEDs 16.

In the present embodiment, among the nine wireless power receivers 120, there are three sets for the red LEDs 16, three sets for the white LEDs 16, and three sets for the blue LEDs 16. The three sets for the red LEDs are called A group, the three sets for the white LEDs are called B group, and the three sets for the blue LEDs are called C group.

Figure 4:
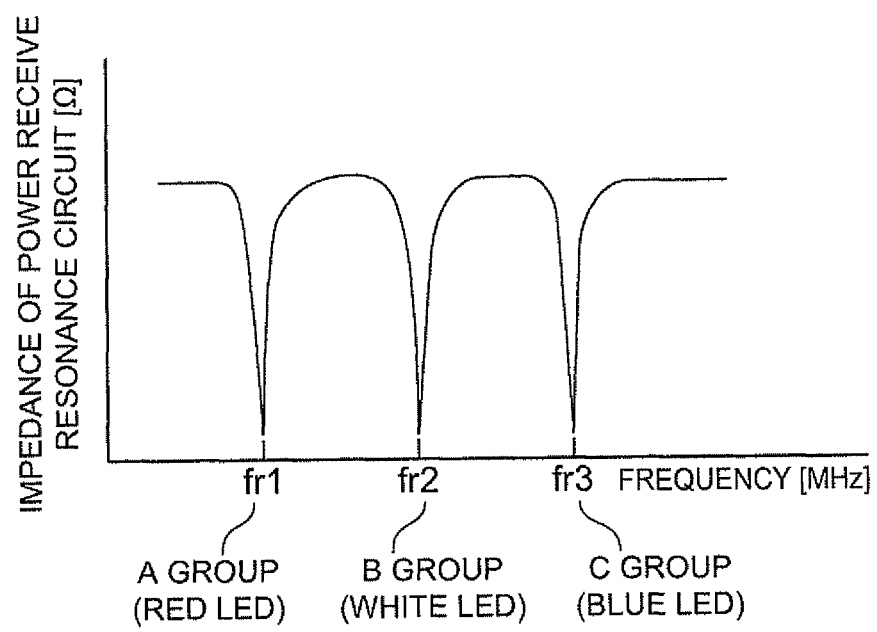
FIG. 4 is a diagram showing a frequency characteristic of impedance in power receive resonance circuits of A group, B group, and C group shown in FIG. 3.

FIG. 4 shows a frequency characteristic of impedance in the power receive resonance circuits 13 of A group, B group, and C group. As shown in FIG. 4, the power receive resonance circuits 13 of A group, B group, and C group are set to have resonance frequencies different from one another, respectively. For example, in the power receive resonance circuit 13 of the A group wireless power receiver 120, the inductance of the power receive coil 11 and the capacitance of the power receive capacitor 12 are determined so as to provide a resonance frequency of fr1. Further, in the power receive resonance circuit 13 of the B group wireless power receiver 120, the inductance of the power receive coil 11 and the capacitance of the power receive capacitor 12 are determined so as to provide a resonance frequency of fr2. Further, in the power receive resonance circuit 13 of the C group wireless power receiver 120, the inductance of the power receive coil 11 and the capacitance of the power receive capacitor 12 are determined so as to provide a resonance frequency of fr3.

In the present embodiment, each of the power feed coil 1 and the power receive coil 11 is wound in a true circular shape, and the winding diameter (outer diameter) of the power receive coil 11 is smaller than ½, preferably not more than ⅙, of the winding diameter (outer diameter) of the power feed coil 1. In other words, the winding region area of the power receive coil 11 is smaller than ¼, preferably not more than 1/36, of the winding region area of the power feed coil 1. Note that the coil shape is not limited to a true circle and may be another shape such as a rectangle and an ellipsoid.

Next, the control circuit 111 in the wireless power feeder 110 will be explained in detail. The control circuit 111 includes a high-frequency amplifier 2 and a microcomputer 3.

The high-frequency amplifier 2 supplies AC power (AC current) to the power feed coil 1 in a drive frequency or at a drive timing according to an instruction from the microcomputer 3 (e.g., approximately 100 kHz). The microcomputer 3 has preliminarily three specific frequencies of fr1, fr2, and fr3 programmed therein, and switches these three frequencies (drive frequencies) to drive the power feed coil 1 by the high-frequency amplifier 2.

For example, when the power feed coil 1 in the wireless power feeder 110 is driven in the frequency fr1, only the wireless power receiver 120 having a resonance frequency corresponding to the frequency of this AC magnetic field obtains power selectively and only the red LEDs of A group are lit. Similarly, when the power feed coil 1 is driven in the frequency fr2, only the white LEDs of B group are lit and, when the power feed coil 1 is driven in the frequency fr3, only the blue LEDs of C group are lit.

Figure 5:
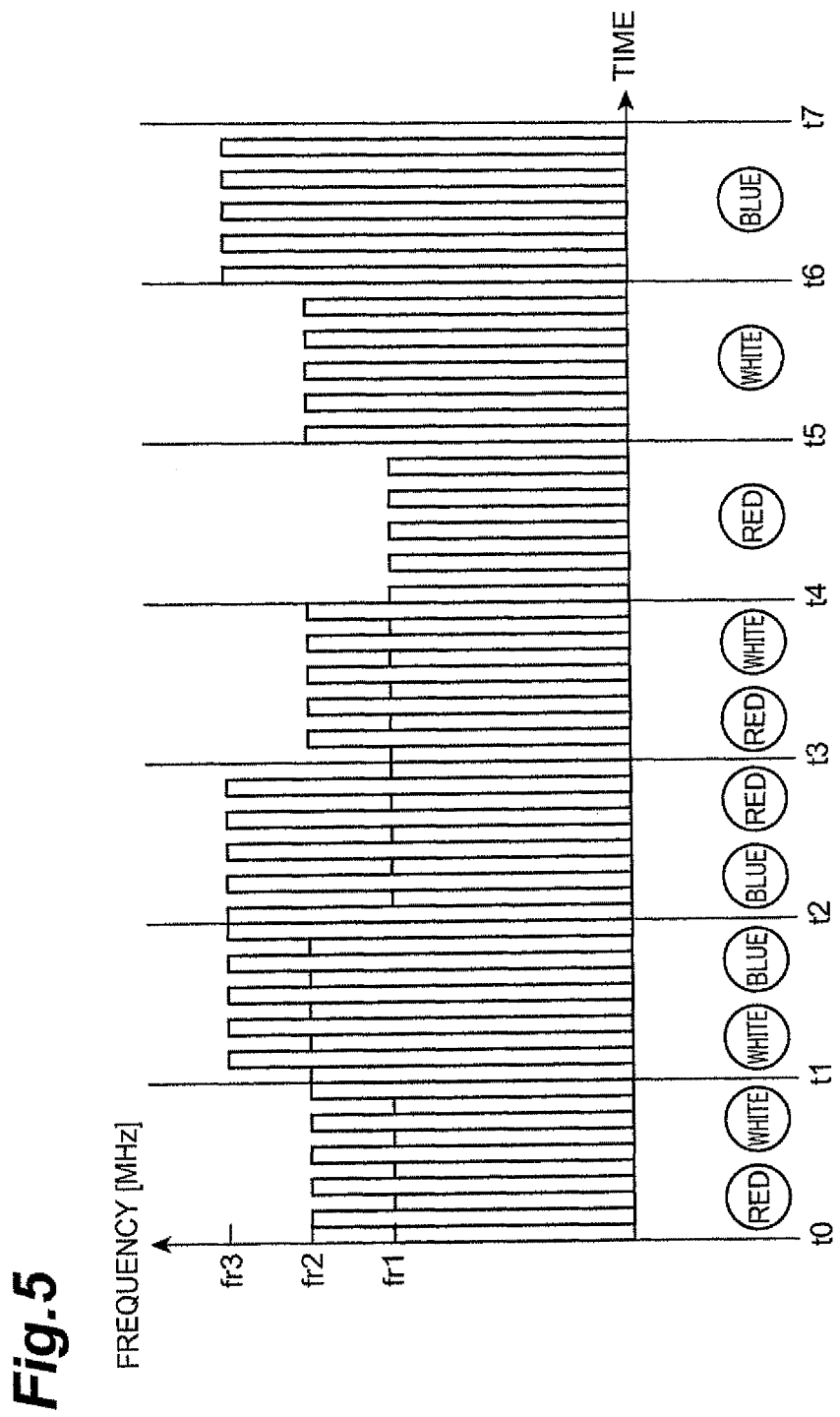
FIG. 5 is a diagram showing an operation example of a control circuit in the wireless power feeder shown in FIG. 3.

Note that various methods can be considered as the LED lighting method. In the following, another lighting method will be illustrated. FIG. 5 is a diagram showing an example for another operation of the control circuit 111 in the wireless power feeder 110. FIG. 5 shows an example of a frequency timing output from the microcomputer 3. In this case, three kinds of frequency are configured to be output from the microcomputer 3, and these frequencies are switched along time (time division) to cause the color of the LEDs to change.

For example, as shown in the period of t0 to t1, by means of switching the frequency output from the microcomputer 3 alternately between the two frequencies fr1 and fr2 in a short time, the red LED lamp and the white LED lamp may be lit alternately. At this time, to a human eye, two colors of red and white appear to be lit in a residual image (same also in the period of t1 to t4). Further, as shown in the period of t4 to t5, for example, the red LED may be lit intermittently by a short time intermittent operation in the frequency fr1 output from the microcomputer 3 (same also in the period of t5 to t7). In this manner, various illumination can be staged by changing color.

In this manner, in the wireless power transmission system 100 of the first embodiment, the plural wireless power receivers 120 have respective resonance frequencies different from one another and the wireless power feeder 110 switches the drive frequency of the power feed coil 1. Thereby, the wireless power feeder 110 can perform power transmission selectively only to the wireless power receiver 120 having a resonance frequency corresponding to the drive frequency.

Meanwhile, when the winding diameter of the power receive coil 11 in the wireless power receiver 120 is equal to or larger than ½ of the winding diameter of the power feed coil 1 in the wireless power feeder 110, the power receive coil 11 is affected magnetically by the power feed coil 1, the mutual inductance between the power feed coil 1 and the power receive coil 11 will change depending on the relative distance thereof, and the resonance frequency will change.

However, in the wireless power transmission system 100 of the first embodiment, since the winding diameter of the power receive coil 11 in the wireless power receiver 120 is smaller than ½ of the winding diameter of the power feed coil 1 in the wireless power feeder 110 (since the winding region area of the power receive coil 11 in the wireless power receiver 120 is smaller than ¼ of the winding region area of the power feed coil 1 in the wireless power feeder 110), the power receive coil 11 is not easily affected magnetically by the power feed coil 1 and it is possible to suppress the change of the mutual inductance which depends on the change of the relative distance between the power feed coil 1 and the power receive coil 11. As a result, it is possible to suppress the change of the resonance frequency and to suppress the complication of the drive frequency control for the power feed coil 1.

Further, substantially the power feed coil 1 does not constitute a resonance circuit and thereby the configuration of the wireless power feeder 110 becomes simple. Then, it is not necessary to adjust a resonance frequency on the side of the wireless power feeder 110 according to the resonance frequency of the power receive resonance circuit 13.

Further, in the wireless power transmission system 100 of the first embodiment, since power transmission is performed by the magnetic field resonance method, it is possible to perform power transmission in a longer distance than in a conventional electromagnetic induction method.

Second Embodiment

Figure 6:
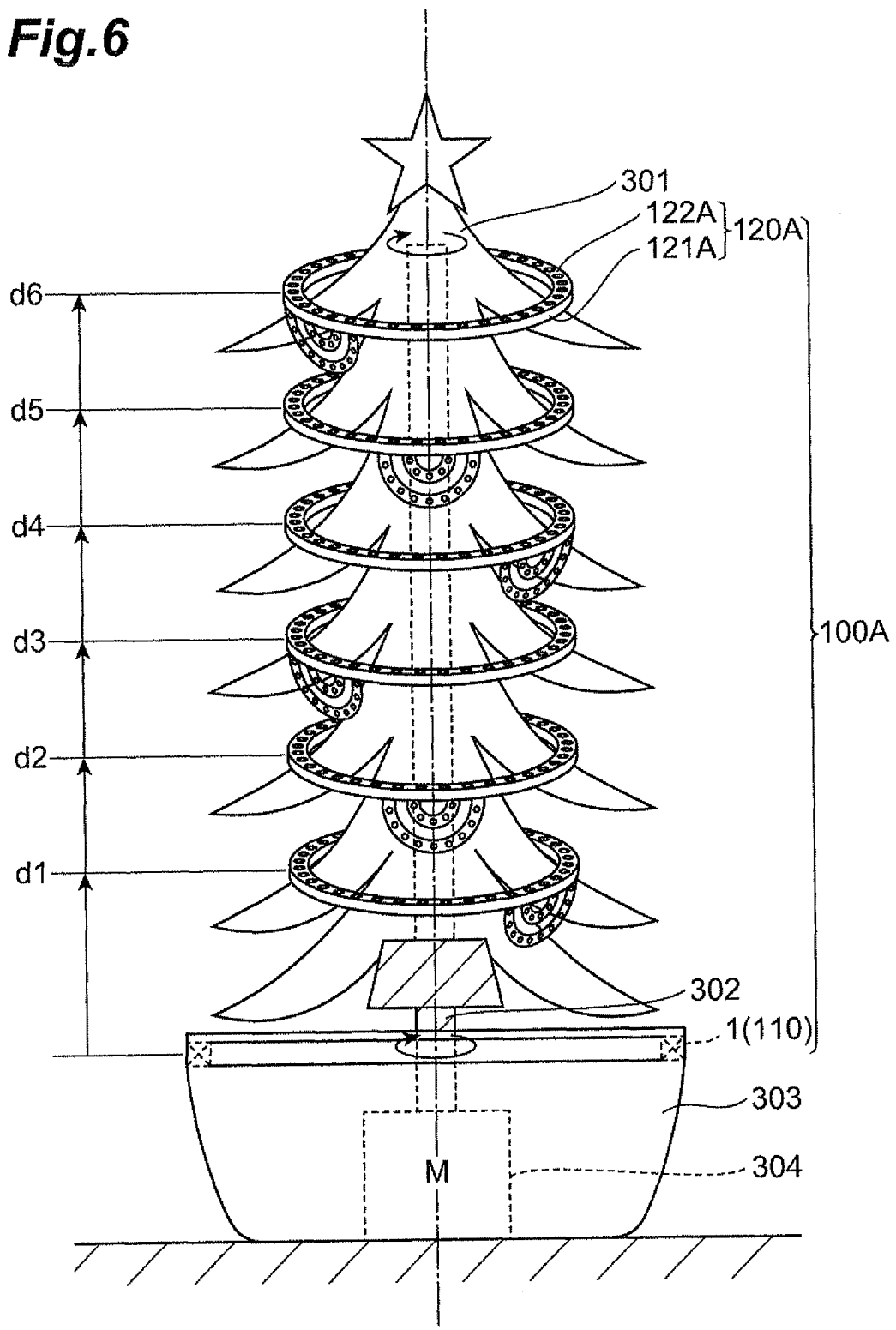
FIG. 6 is a diagram showing a schematic configuration of a wireless power transmission system according to a second embodiment of the present invention.

FIG. 6 is a diagram showing a schematic configuration of a wireless power transmission system 100A according to a second embodiment of the present invention. As shown in FIG. 6, the wireless power transmission system 100A is mounted in the above Christmas tree unit. That is, the wireless power feeder 110 in the wireless power transmission system 100A is mounted in the plant pot 303 and plural wireless power receivers 120A in the wireless power transmission system 100A are mounted in the Christmas tree 301.

Figure 7:
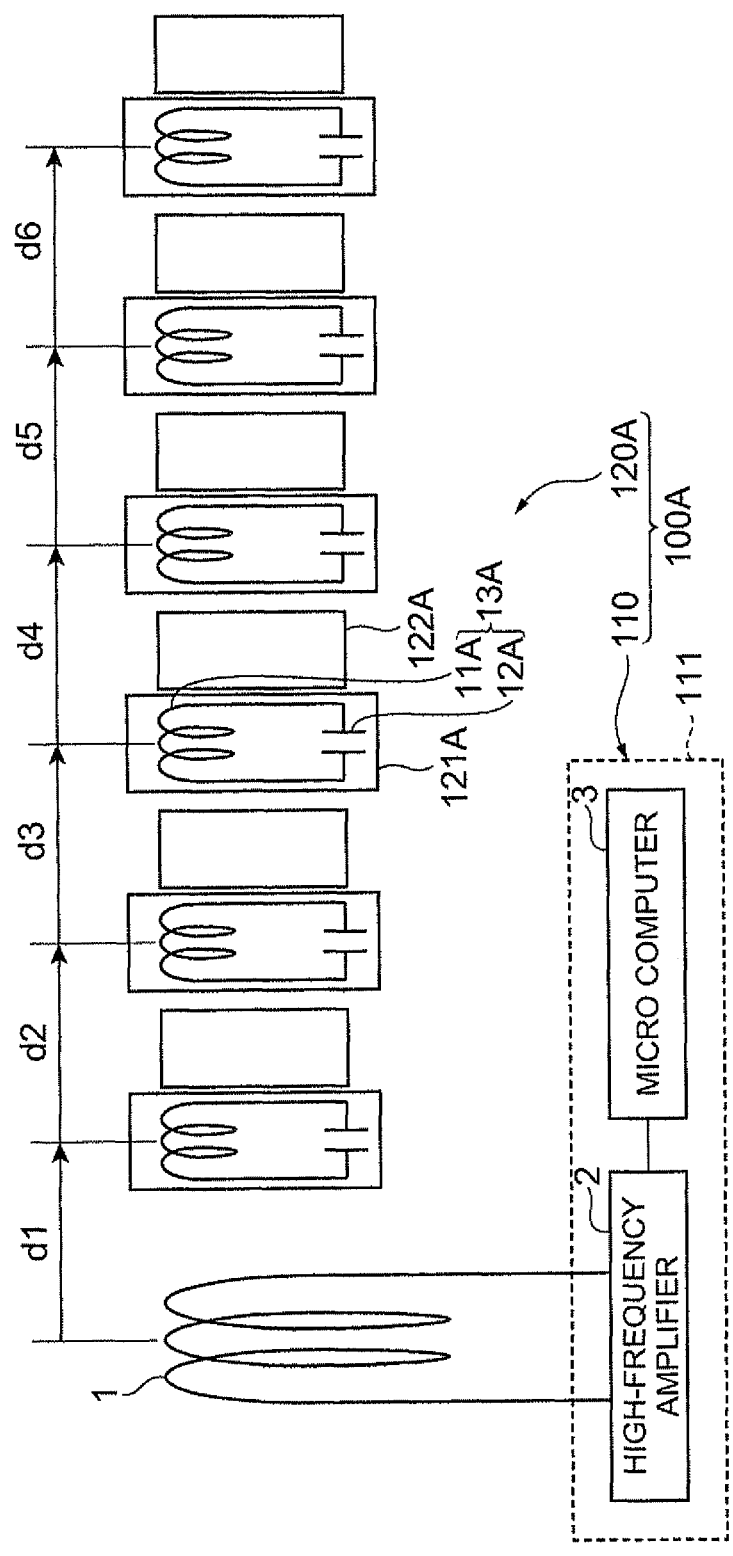
FIG. 7 is a diagram showing an electrical configuration of a wireless power transmission system according to a second embodiment of the present invention.

FIG. 7 is a diagram showing an electrical configuration of the wireless power transmission system 100A according to the second embodiment of the present invention. As shown in FIG. 7, in the wireless power transmission system 100A, the plural wireless power receivers 120A may be provided replacing the plural wireless power receivers 120.

The wireless power receiver 120A includes a power receive unit 121A and a lamp unit 122A. The power receive unit 121A includes a power receive resonance circuit 13A having a power receive coil 11A, and a power receive capacitor 12A, and a power receive load coil 14A which is wound around an outer perimeter of the power receive coil 11A and electromagnetically coupled to the power receive coil 11A. The lamp unit 122A includes a regulator (AC/DC) 15A stabilizing power induced in the power receive load coil 14A and plural LEDs 16A connected to the regulator 15A.

Figure 8:
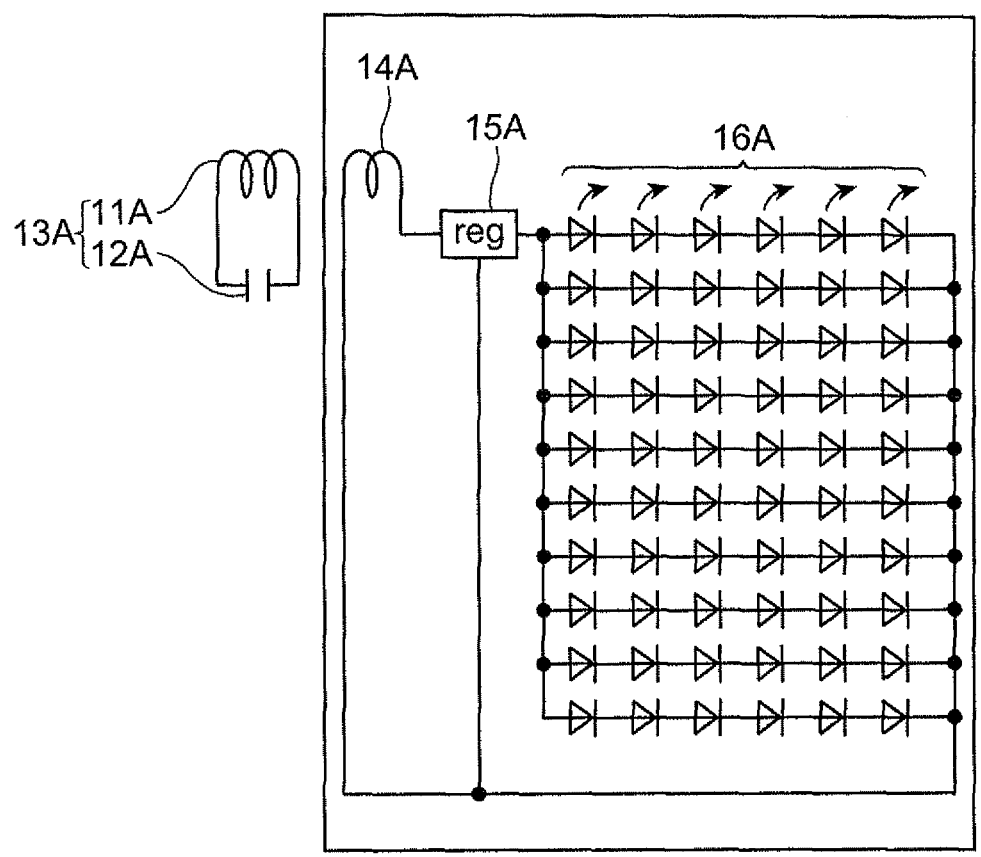
FIG. 8 is a diagram showing details of the wireless power receiver shown in FIG. 7.

Note that, in the present embodiment, as shown in FIG. 8, ten serial LED groups in each of which six LEDs are connected serially are connected in parallel to one another among the plural LEDs 16A. Further, a high frequency power of approximately 10 MHz, for example, is induced in the power receive load coil 14A. Further, the regulator 15A supplies a stabilized DC voltage of approximately 24 V, for example, to the LEDs 16A.

The second embodiment is different from the first embodiment in the point that all the resonance frequencies of the power receive resonance circuits 13A in the plural wireless power receivers 120A are the same, respectively. That is, in the plural wireless power receivers 120A, inductances of the power receive coils 11A in the power receive resonance circuits 13A are set to be the same, respectively, and also capacitances of the power receive capacitors 12A in the power receive resonance circuits 13A are set to be the same, respectively.

Here, that all the resonance frequencies are the same means that the respective resonance frequencies of the power receive resonance circuits are approximately the same when the power feed coil and the power receive coil are sufficiently apart from each other or when the coupling degrees between the power feed coil and the respective power receive coils are not considerably different from one another.

Further, the second embodiment is different from the first embodiment in the point that the power feed coil 1 in the wireless power feeder 110 and the respective power receive coils 11A in the six wireless power receivers 120A are disposed at equal spaces sequentially from a reference position where the power feed coil 1 is located. That is, the power receive coils 11A in the six power receive units 121A are disposed at positions apart from the reference position (original point) of the power feed coil 1 by distances d1, d2, d3, d4, d5, and d6 (d1=d2−d1=d3−d2=d4−d3=d5−d4=d6−d5), respectively.

Note that the winding center axis of each of the power receive coils 11A is approximately the same as the winding center axis of the power feed coil 1 and the winding plane (winding plane perpendicular to the winding center axis) in each of the power receive coils 11A is disposed so as to become approximately parallel to the winding plane of the power feed coil 1.

Further, the second embodiment is different from the first embodiment in the point that each of the power feed coil 1 and the power receive coil 11A is wounded in a true circular shape and the winding diameter (outer diameter) of the power receive coil 11A is not less than ½ of, preferably not less than ⅔ of and further preferably not less than, the winding diameter (outer diameter) of the power feed coil 1. In other words, the second embodiment is different from the first embodiment in the point that the winding region area of the power receive coil 11A is not less than ¼ of, preferably not less than 4/9 of and further preferably not less than, the winding region area of the power feed coil 1. Note that the shape of the coil is not limited to a true circle and may be another shape such as a rectangle and an ellipsoid.

Figure 9:
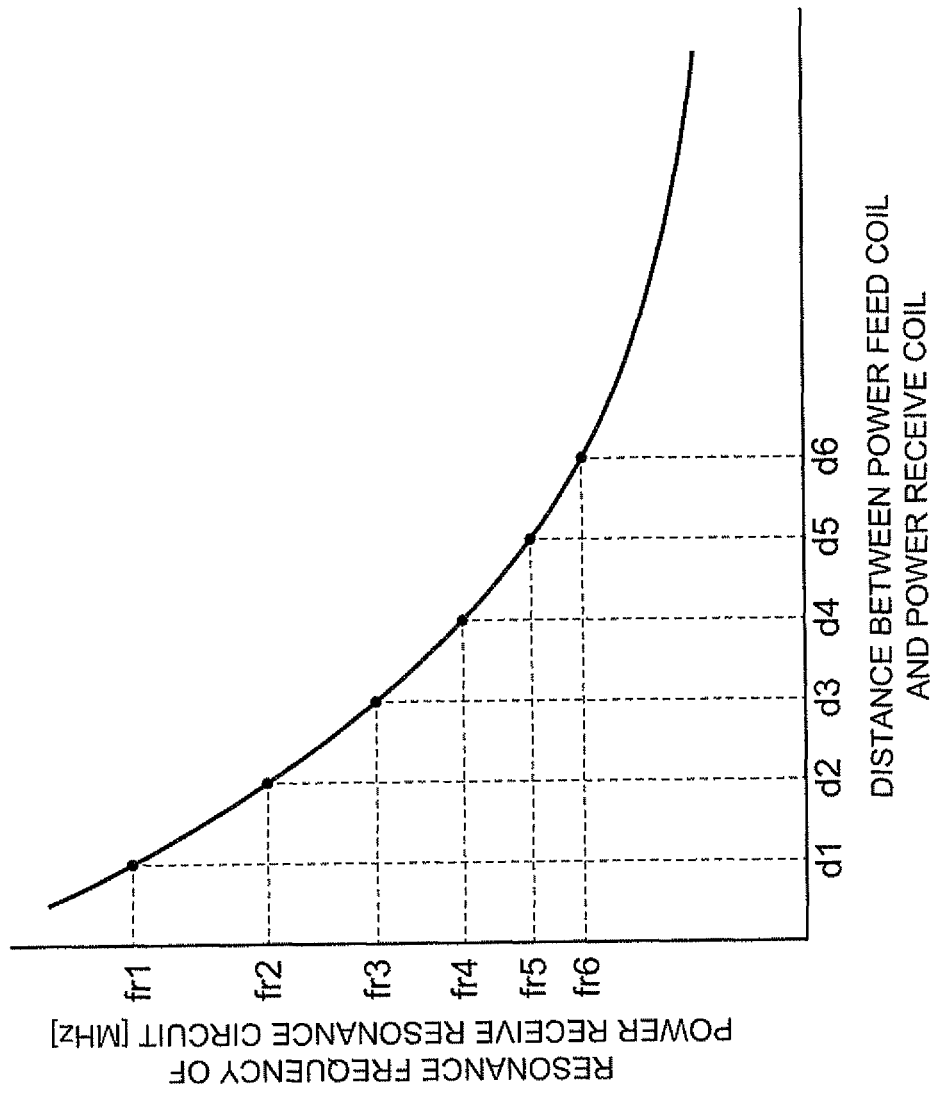
FIG. 9 is a diagram showing a resonance frequency of a power receive resonance circuit against a relative distance between the power feed coil and the power receive coil shown in FIG. 7.

FIG. 9 is a diagram showing a resonance frequency of the power receive resonance circuit 13A against a relative distance between the power feed coil 1 and the power receive coil 11A in the second embodiment. The second embodiment utilizes the fact that the mutual inductance changes depending on the relative distance between the power feed coil 1 and the power receive coil 11A and thereby the resonance frequency changes. That is, as shown in FIG. 9, the resonance frequency of the power receive resonance circuit 13A changes to fr1, fr2, fr3, fr4, fr5, and fr6 when the relative distance between the power feed coil 1 and the power receive coil 11A changes to d1, d2, d3, d4, d5, and d6, respectively.

In the wireless power feeder 110, the microcomputer 3 preliminarily has the information of the resonance frequencies of fr1 to fr6 programmed therein, and switches these frequencies (drive frequencies) to drive the power feed coil 1 by the high-frequency amplifier 2. Note that the wireless power feeder 110, even without preliminarily having the information of the resonance frequency, may obtain the resonance frequency of the wireless power transmission by obtaining information corresponding to the distance between the power feed coil 1 and the power receive coil 11A.

Figure 10:
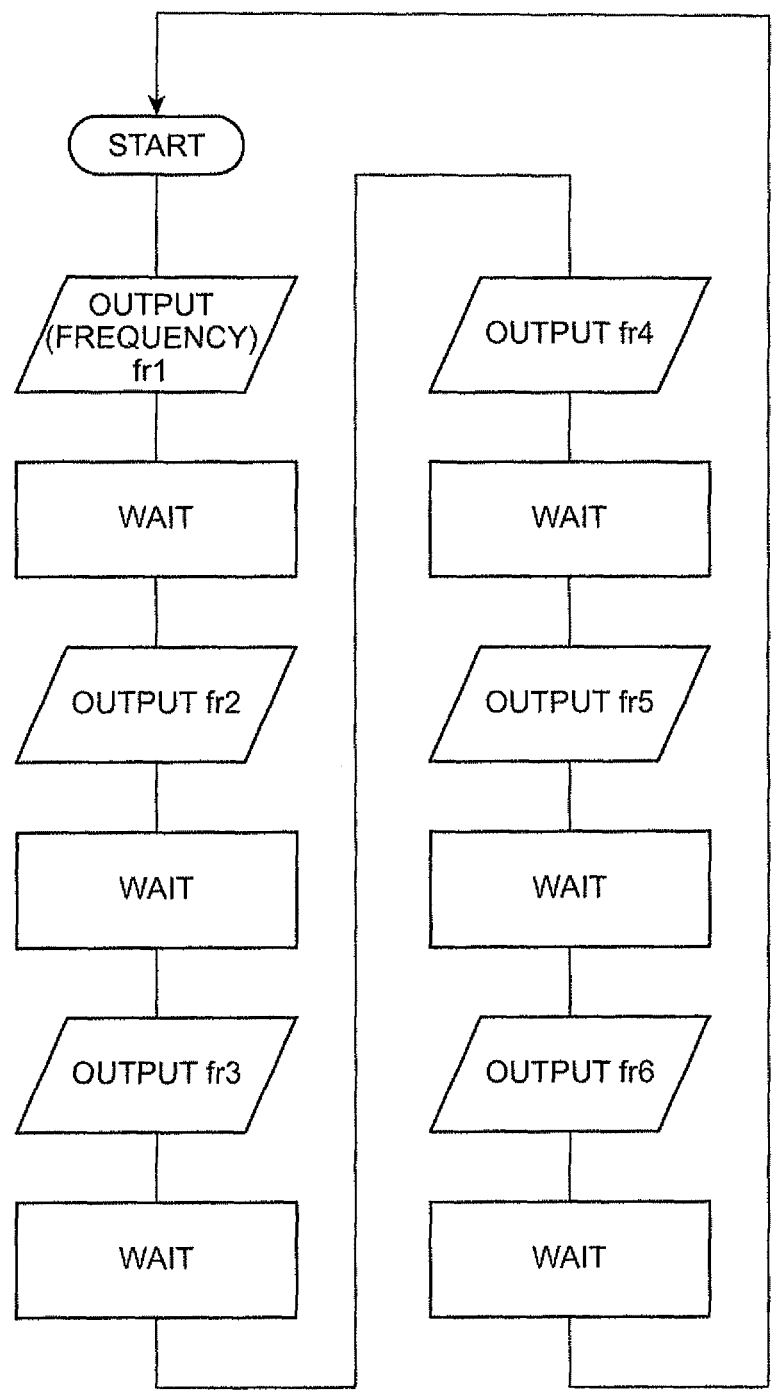
FIG. 10 is a flowchart showing an operation example of the control circuit shown in FIG. 7.

FIG. 10 is a flowchart showing an operation example of the control circuit 111. As shown in FIG. 10, for example, the microcomputer 3 sends a signal for setting the frequency (drive frequency) to fr1 to the high-frequency amplifier 2, and, after a certain time (after a certain time has elapsed), the microcomputer 3 sends a signal for setting the frequency (drive frequency) to fr2 to the high-frequency amplifier 2, and then, after a certain time (after a certain time has elapsed), the microcomputer 3 sends a signal for setting the frequency (drive frequency) to fr3 to the high-frequency amplifier 2. The microcomputer 3 repeats such processing and sends a signal for setting the frequency (drive frequency) to fr6 to the high-frequency amplifier 2, and then, after a certain time (after a certain time has elapsed), repeats the step to return the frequency to fr1 again. Thereby, in the Christmas tree unit shown in FIG. 6, the LEDs 16A in the lamp unit 122A are sequentially lit in the order from the lowest side one, second one, third one, . . . , and sixth one, and, after the sixth one has been lit, the lighting can be repeated by returning to the first one.

According to this wireless power transmission system 100A of the second embodiment, since the winding diameter of the power receive coil 11A in the wireless power receiver 120A is equal to or larger than ½ of the winding diameter of the power feed coil 1 in the wireless power feeder 110 (since the winding region area of the power receive coil 11A in the wireless power receiver 120A is equal to or larger than ¼ of the winding region area of the power feed coil 1 in the wireless power feeder 110), the power receive coil 11A is easily affected magnetically by the power feed coil 1. As a result, even if the resonance frequencies of the power receive resonance circuits 13A in the plural wireless power receivers 120A are approximately the same as one another, respectively, it is possible to perform non-contact power transmission from the wireless power feeder 110 selectively to the plural wireless power receivers 120A by utilizing the fact that the mutual inductance changes depending on the relative distance between the power feed coil 1 and the power receive coil 11A and thereby the resonance frequency changes, when the power receive coils 11A in the plural wireless power receivers 120A are disposed in distances different from one another from the power feed coil 1, respectively.

Further, according to this wireless power transmission system 100A, since the same power receive coil and power receive capacitor can be used in the plural wireless power receivers 120A, the same product can be used for the plural wireless power receivers 120A.

Further, since substantially the power feed coil 1 does not constitute a resonance circuit, the configuration of the wireless power feeder 110 becomes simple.

Third Embodiment

Here, in the wireless power transmission system of the present embodiment, the above plural wireless power receivers 120 and the above plural wireless power receivers 120A may be mixed.

Figure 15:
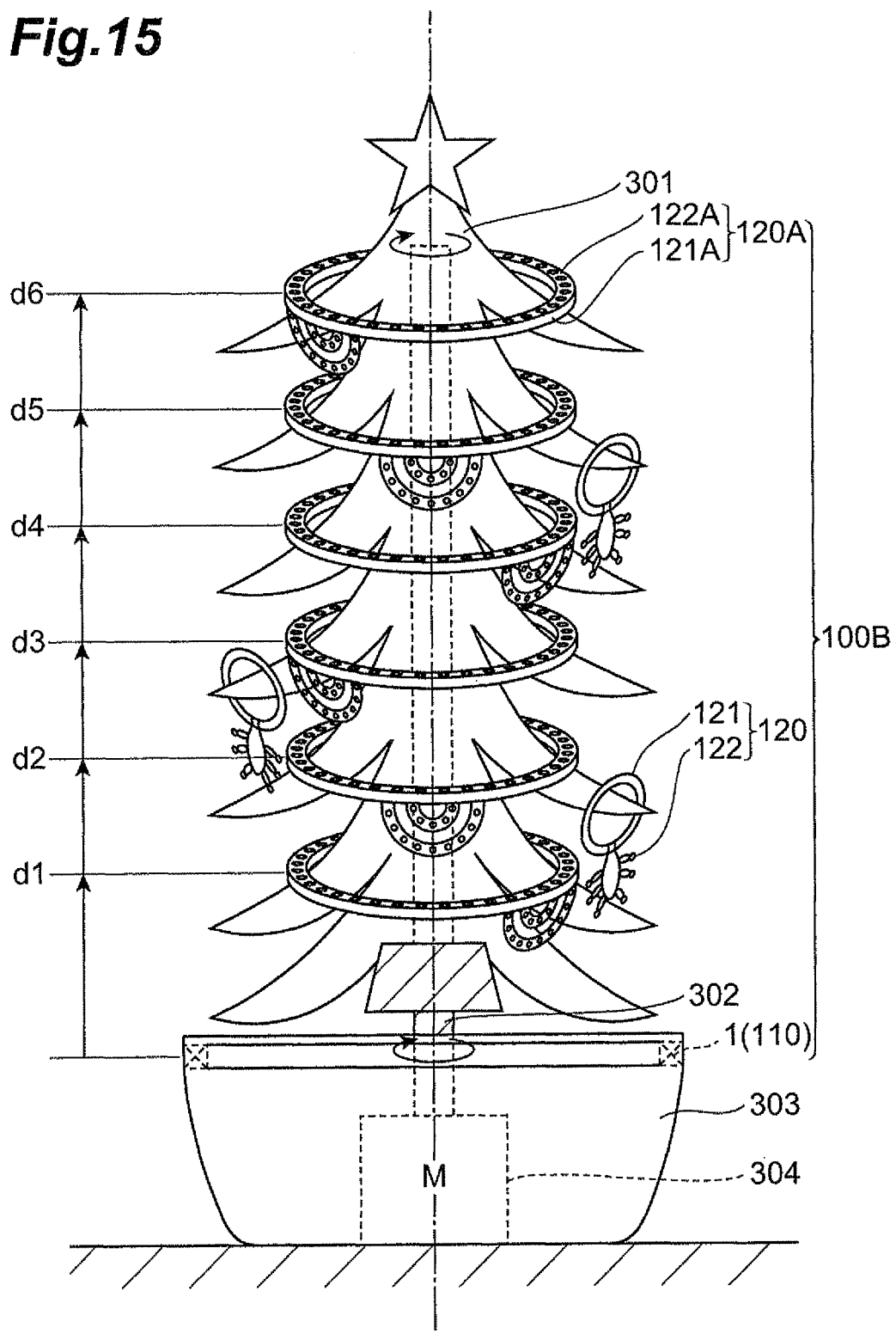
FIG. 15 is a diagram showing a schematic configuration of a wireless power transmission system according to a third embodiment of the present invention.

FIG. 15 is a diagram showing a schematic configuration of a wireless power transmission system 100B according to a third embodiment of the present invention. This wireless power transmission system 100B includes three wireless power receivers 120 in addition to the six wireless power receivers 120A in the wireless power transmission system 100A.

For example, as described above, the resonance frequency of the power receive resonance circuit 13A in each of the six wireless power receivers 120A changes to fr1, fr2, fr3, fr4, fr5, and fr5 depending on the relative distances of d1, d2, d3, d4, d5, and d6 between the power feed coil 1 in the wireless power feeder 110 and the power receive coils 11A, respectively. On the other hand, the resonance frequencies of the power receive resonance circuits 13 in the three wireless power receivers 120 are set to fr1', fr2', and fr3' according to the inductances of the power receive coils 11 and the capacitances of the power receive capacitors 12, respectively.

In this case, in the wireless power feeder 110, the microcomputer 3 preliminarily has the information of these resonance frequencies fr1 to fr6 and fr1' to fr3' programmed therein, and switches these frequencies (drive frequencies) to drive the power feed coil 1 by the high-frequency amplifier 2.

Note that the resonance frequencies of some of the power receive resonance circuits 13A in the six wireless power receivers 120A may be made the same as the resonance frequencies of some of the power receive resonance circuits 13 in the three wireless power receivers 120, respectively, and some of the lamp units 122A in the six wireless power receivers 120A and some of the lamp units 122 in the three wireless power receivers 120 may be lit at the same time.

Note that the present invention is not limited to the above embodiments and can be modified variously. For example, while, in the present embodiments, the non-resonance type in which the wireless power feeder 110 includes only the power feed coil 1 is illustrated, the wireless power feeder may include a power feed resonance circuit having a power feed coil and a power feed capacitor. In this case, the resonance frequency of the power feed resonance circuit may be changed so as to correspond to the resonance frequency of the power receive resonance circuit by the use of a variable capacitor for the power feed capacitor, for example. Further, for example, while the high-frequency amplifier 2 supplies AC current directly to the power feed coil 1 in the present embodiments, the present invention is not limited to this case. An excitation coil coupled to the power feed coil 1 by electromagnetic induction may be provided and the AC current may be supplied via the excitation coil.

Further, the features of the present invention can be applied not only to the power transmission but also to signal transmission. For example, the wireless power transmission system of the present invention can be applied when an analog signal or a digital signal is transmitted by a non-contact method by means of utilizing the magnetic field resonance effect.

Note that the present invention can be applied to a system performing wireless power transmission from one wireless power feeder selectively to plural wireless power receivers, such as a Christmas tree unit which is decorated with decoration LEDs and rotates over a plant pot, exhibited goods which wirelessly receive power on a turntable disposed over a casing including a power source (lighting equipment, electric toys, home electric appliances in general, etc.), and the like. Further, the present invention can be applied to a traffic light (Variation example 1), a judgment device for a wireless power receiver which is used in a 1:N wireless power transmission system (Variation example 2), and the like.

Variation Example 1

Figure 11:
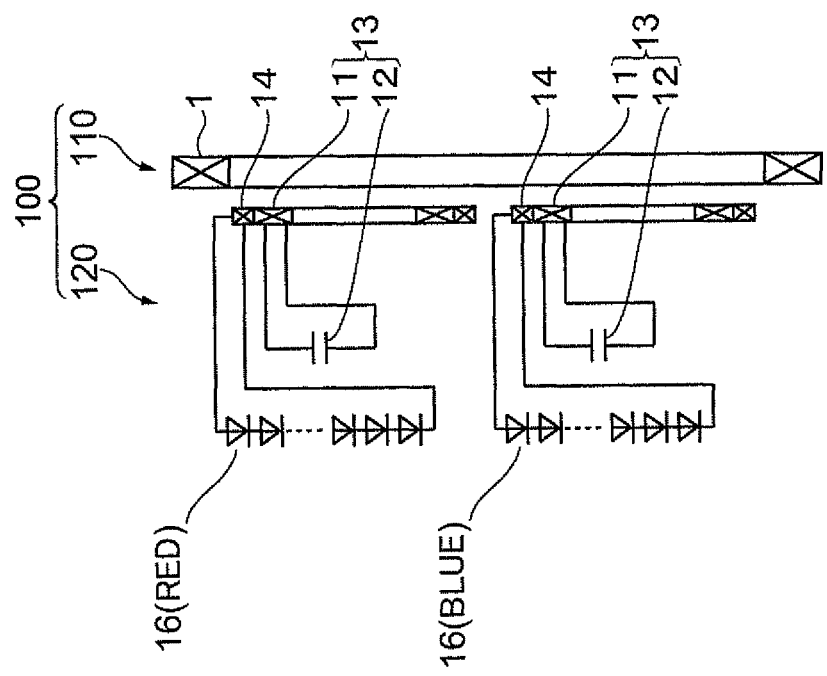
FIG. 11 is a diagram showing a configuration of a wireless power transmission system according to Variation example 1 of the present invention.
Figure 11:
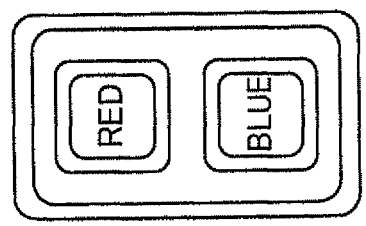

FIG. 11 is a diagram showing a configuration of a wireless power transmission system according to Variation example 1 of the present invention. A traffic light shown in FIG. 11 is a traffic light for a pedestrian which can be lit in two colors of red and green, and includes one wireless power feeder 110 having one power feed coil 1 and two wireless power receivers 120 for red and green lighting.

The wireless power receiver 120 for red lighting includes a power receive coil 11 (inductance L1), a power receive capacitor 12 (capacitance C1), a power receive load coil 14, and plural red LEDs 16 serially connected to the power receive load coil 14. The power receive coil 11 and the power receive capacitor 12 configure a power receive resonance circuit 13, and the resonance frequency thereof is provided as $fr1=1/2\pi\sqrt{(L1 \times C1)}$. On the other hand, the wireless power receiver 120 for the green lighting includes a power receive coil 11 (inductance L2), a power receive capacitor 12 (capacitance C2), a power receive load coil 14, and plural green LEDs 16 serially connected to the power receive load coil 14. The power receive coil 11 and the power receive capacitor 12 configure a power receive resonance circuit 13, and the resonance frequency thereof is provided as $fr2=1/2\pi\sqrt{(L2 \times C2)}$. In this wireless power transmission system 100 of Variation example 1, the traffic light is lit in red when the drive frequency of the power feed coil 1 in the wireless power feeder 110 is fr1, and the traffic light is lit in green when the drive frequency of the power feed coil 1 is fr2.

Figure 12:
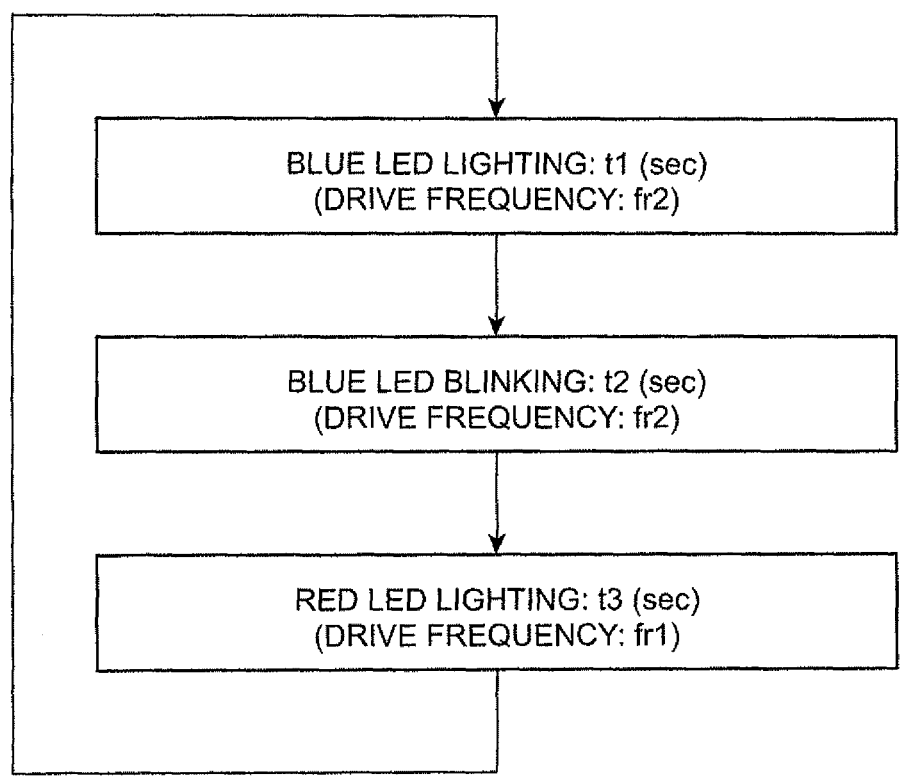
FIG. 12 is a flowchart showing an operation example of the wireless power feeder shown in FIG. 11.

FIG. 12 is a flowchart showing an operation example of the wireless power feeder. As shown in FIG. 12, for example, the green LED 16 is lit for t1 seconds when the drive frequency of the power feed coil1 1 is set to fr2, and, after the green LED 16 is blinked for t2 seconds, the red LED 16 is lit for t3 seconds when the drive frequency of the power feed coil 1 is set to fr1. By repeating this operation, it is possible to realize a traffic light.

Variation Example 2

Figure 13:
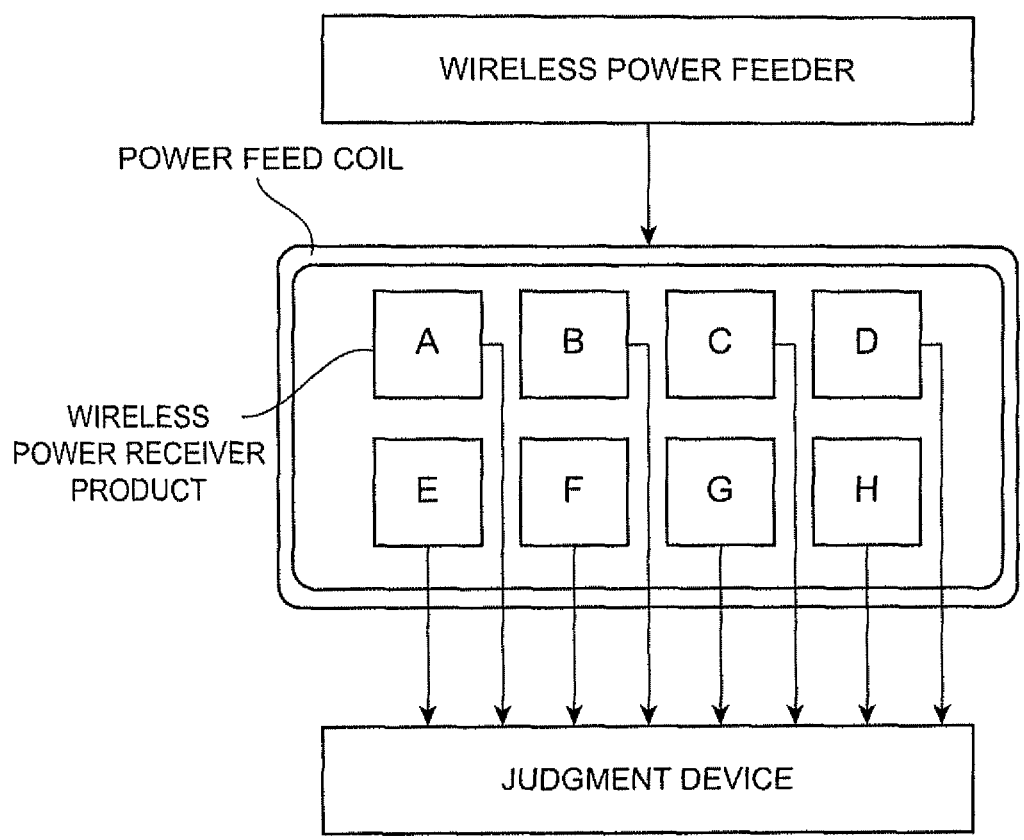
FIG. 13 is a diagram showing a configuration of a wireless power transmission system according to Variation example 2 of the present invention.
Figure 14:
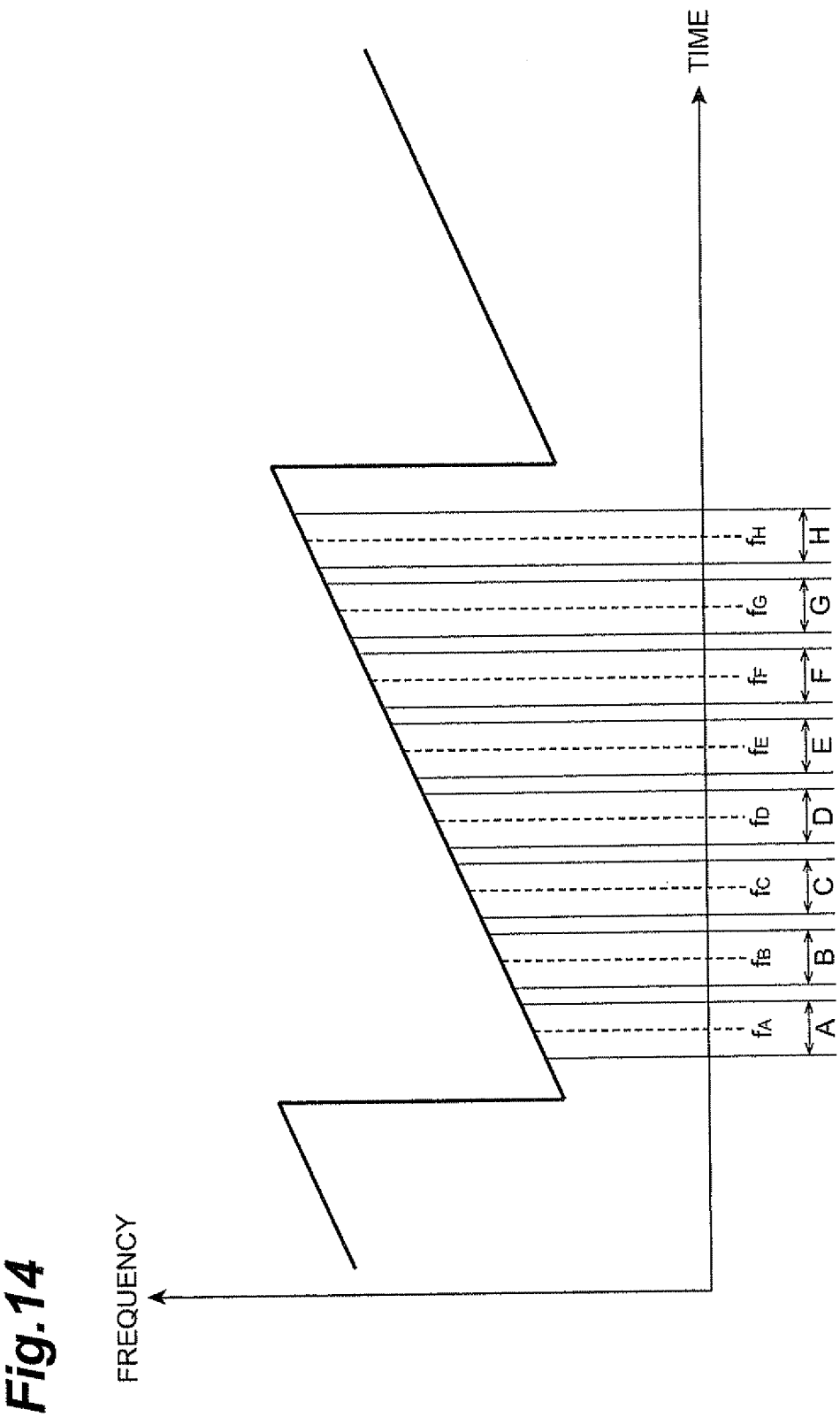
FIG. 14 is a diagram showing an example of a frequency sweep waveform in the wireless power feeder shown in FIG. 13.

FIG. 13 is a diagram showing a configuration of a wireless power transmission system according to Variation example 2 of the present invention. A judgment device for a wireless power receiver used for a 1:N wireless power transmission system is shown in FIG. 13. This judgment device tests eight wireless power receiver products of A to H and judges pass or fail of the wireless power receiver products (good product/defective product, conforming product/nonconforming product). The resonance frequencies of the power receive resonance circuits in the wireless power receiver products of A to H are set so as to have typical values of fA, fB, fC, fD, fE, fG, and fH, respectively. Further, the specifications of resonance frequency ranges of the power receive resonance circuits in the wireless power receiver products of A to H are A, B, C, D, E, F, G, and H, respectively. A wireless power feeder performs frequency sweep. FIG. 14 is a diagram showing an example of a frequency sweep waveform in the wireless power feeder. As shown in FIG. 14, the wireless power feeder sweeps frequencies in a saw-tooth waveform. The wireless power feeder sweeps frequencies in this manner and the judgment device judges whether or not the result thereof falls within the specification range of the wireless power receiver product, and thereby pass or fail of the wireless power receiver product is decided.

Note that, while the element for the magnetic resonance effect is called a "coil" in the present specification, the element is sometimes called a "transmitter", "antenna", or the like depending on a related technical field.

While, hereinabove, the principle of the present invention has been explained in the preferable embodiments with reference to the drawings, it is recognized by those skilled in the art that the present invention can be changed in disposition and in detail without departing from such a principle. The present invention is not limited to a specific configuration disclosed in the embodiments. Accordingly, the right is claimed for all the modifications and variations based on the range and the spirit of the claims.

What is claimed is:

1. A wireless power transmission system which performs non-contact power transmission from a wireless power feeder selectively to one or more of a plurality of wireless power receivers, each of the plurality of wireless power receivers being provided with a lamp unit, each of the plurality of wireless power receivers comprising a power receive resonance circuit including a power receive coil and a power receive capacitor, and having a resonance frequency, and the wireless power feeder comprising a power feed coil and a control circuit, the control circuit including a high-frequency amplifier and a micro-computer, the high-frequency amplifier supplying AC power to the power feed coil at a drive frequency according to an instruction from the micro-computer, wherein the micro-computer switches the drive frequency to a frequency that is programmed in advance, in a short period of time;

the drive frequency is time divided;

the control circuit in the wireless power feeder performs power feeding selectively to a wireless power receiver of the plurality of wireless power receivers by changing frequency of the AC power to the frequency that coincides with the wireless power receiver to cause residual image effect between adjacent periods of divided time the power receive resonance circuits in the plurality of wireless power receivers have approximately the same resonance frequency, the power receive coils in the plurality of wireless power receivers are disposed in distances different from one another from the power feed coil, respectively, an area encompassed by windings of the power receive coil in each of the plurality of wireless power receivers is equal to or larger than ¼ of an area encompassed by windings of the power feed coil, and the micro computer is programmed in advance with the frequency that corresponds to a relative distance between (i) the power receive coil of each of the plurality of wireless power receivers and (ii) the power feed coil.

2. The wireless power transmission system according to claim 1, wherein the power receive resonance circuits in the plurality of wireless power receivers have approximately the same resonance frequency, the power receive coils in the plurality of wireless power receivers are disposed in distances different from one another from the power feed coil, respectively, and a diameter of an area encompassed by windings of the power receive coil in each of the plurality of wireless power receivers is equal to or larger than ½ of a diameter of an area encompassed by windings of the power feed coil.

3. The wireless power transmission system according to claim 2, wherein the power feed coil in the wireless power feeder substantially does not constitute a resonance circuit.

4. The wireless power transmission system according to claim 1, wherein the power feed coil in the wireless power feeder substantially does not constitute a resonance circuit.

5. The wireless power transmission system according to claim 1, wherein the control circuit in the wireless power feeder performs power supply so that AC power having frequencies corresponding to each of the power receive resonance circuits in the plurality of wireless power receivers is supplied to the power receive coils in a time division manner.

6. A wireless power transmission system which performs non-contact power transmission from a wireless power feeder selectively to one or more of a plurality of wireless power receivers, each of the plurality of wireless power receivers being provided with a lamp unit, each of the plurality of wireless power receivers comprising a power receive resonance circuit including a power receive coil and a power receive capacitor, and having a resonance frequency, and the wireless power feeder comprising a power feed coil and a control circuit, the control circuit including a high-frequency amplifier and a micro-computer, the high-frequency amplifier supplying AC power to the power feed coil at a drive frequency according to an instruction from the micro-computer, wherein the micro-computer switches the drive frequency to a frequency that is programmed in advance, in a short period of time;

the drive frequency is time divided;

the control circuit in the wireless power feeder performs power feeding selectively to a wireless power receiver of the plurality of wireless power receivers by changing frequency of the AC power to the frequency that coincides with the wireless power receiver to cause residual image effect between adjacent periods of divided time the power receive resonance circuits in some wireless power receivers among the plurality of wireless power receivers have resonance frequencies different from one another, respectively, an area encompassed by windings of the power receive coil in each of the some wireless power receivers is smaller than ¼ of an area encompassed by windings of the power feed coil, the power receive resonance circuits in the other wireless power receivers among the plurality of wireless power receivers have approximately the same resonance frequency, the power receive coils in the other wireless power receivers are disposed in distances different from one another from the power feed coil, respectively, an area encompassed by windings of the power receive coil in each of the other wireless power receivers is equal to or larger than ¼ of the area encompassed by windings of the power feed coil, and the micro-computer is programmed in advance with (i) different resonance frequencies of some of the wireless power receivers among the plurality of wireless power receivers and (ii) the frequency that corresponds to a relative distance between (a) the power receive coil of the other wireless power receivers among the plurality of wireless power receivers and (b) the power feed coil.

* * * * *